United States Patent [19]
Dalton

[11] Patent Number: 5,832,642
[45] Date of Patent: Nov. 10, 1998

[54] ILLUMINATED ADDRESS SIGN

[76] Inventor: Thomas K. Dalton, 1144 J Ave., Nevada, Iowa 50201

[21] Appl. No.: 779,833

[22] Filed: Jan. 7, 1997

[51] Int. Cl.⁶ .................................................. G09F 13/18
[52] U.S. Cl. ............................. 40/546; 40/552; 40/622; 362/812
[58] Field of Search ............................ 40/546, 547, 552, 40/564, 622; 362/31, 812

[56] References Cited

U.S. PATENT DOCUMENTS

| | | | |
|---|---|---|---|
| 1,741,748 | 12/1929 | White | 40/546 |
| 1,972,155 | 9/1934 | McMaster | 362/812 X |
| 2,135,859 | 11/1938 | Swanson | 40/546 |
| 2,177,641 | 10/1939 | Evans | 362/812 X |
| 2,276,114 | 3/1942 | Sture | 40/546 |
| 2,437,944 | 3/1948 | Edwards | 362/812 X |
| 2,560,117 | 7/1951 | Mallary | 362/812 X |
| 2,637,926 | 5/1953 | Anderson | 40/546 |
| 5,228,223 | 7/1993 | Lan | 40/546 X |
| 5,435,087 | 7/1995 | Karkar et al. | 40/575 |
| 5,499,165 | 3/1996 | Holmes, Jr. | 40/546 X |

FOREIGN PATENT DOCUMENTS

| | | | |
|---|---|---|---|
| 207439 | 11/1955 | Australia | 40/546 |
| 277177 | 8/1951 | Switzerland | 40/546 |

*Primary Examiner*—Brian K. Green

[57] ABSTRACT

A new illuminated address sign for displaying a street address on a building. The illuminated address sign includes a light housing having at least one open face, a light source disposed in the light housing, a face plate mounted on the open face of the light housing, and at least one alphanumeric member being accepted by the face plate.

10 Claims, 3 Drawing Sheets

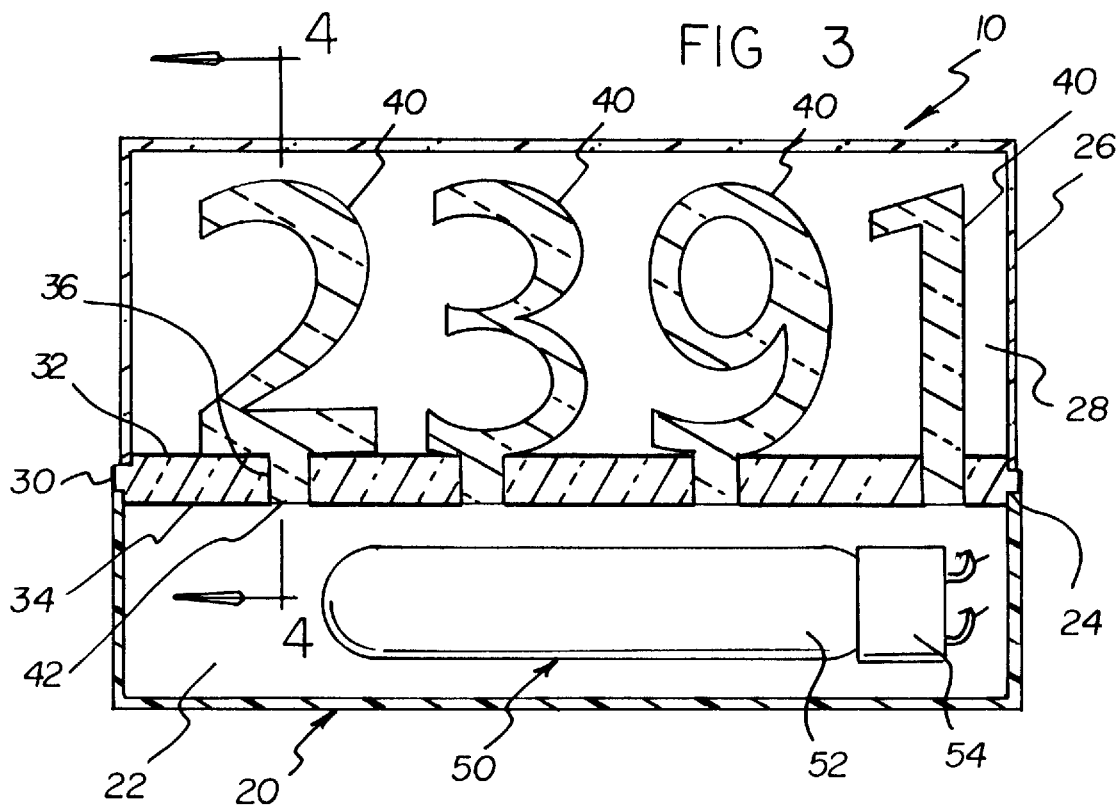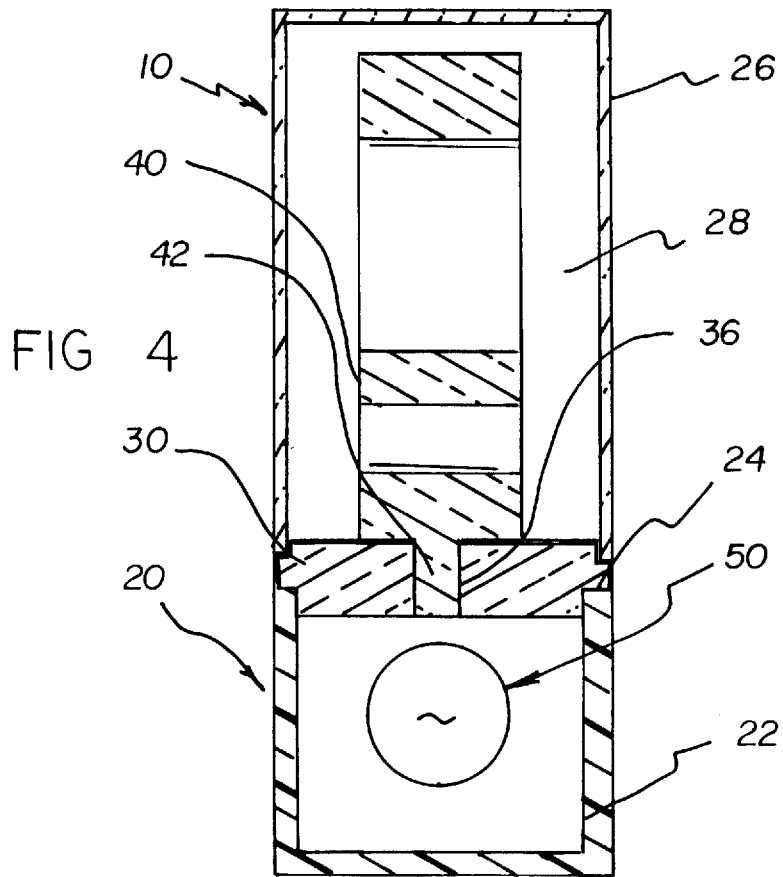

FIG 5
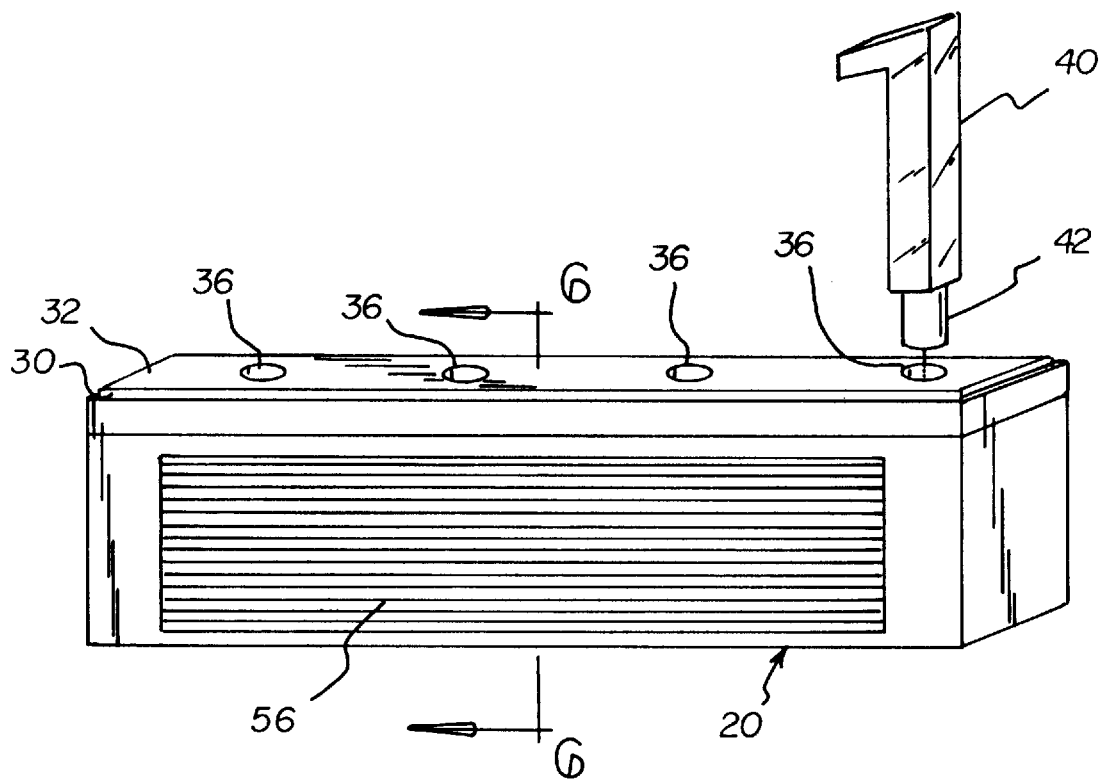
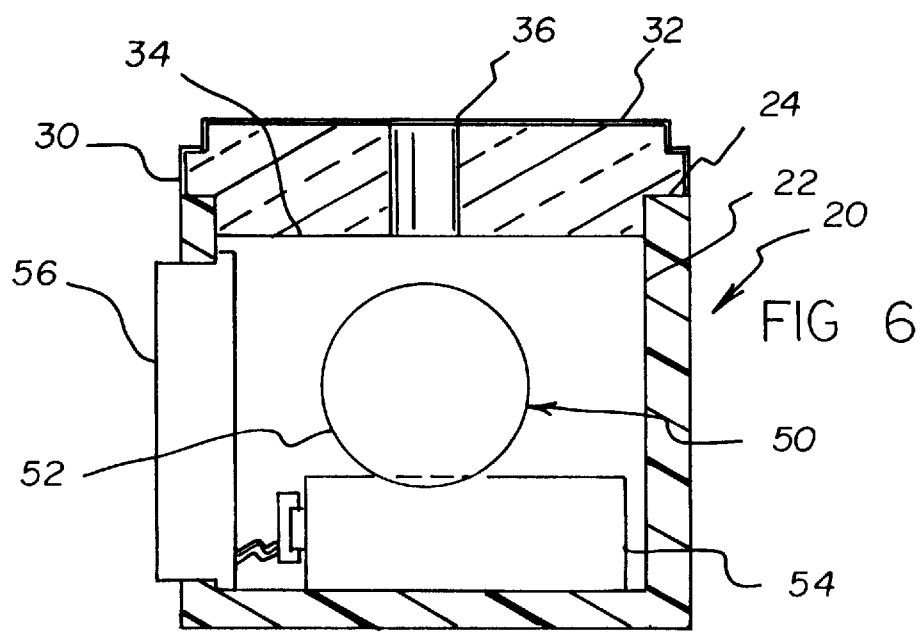

ILLUMINATED ADDRESS SIGN

BACKGROUND OF THE INVENTION

1. Field of the Invention

The present invention relates to lighted signs and more particularly pertains to a new Illuminated Address Sign for displaying a street address on a building.

2. Description of the Prior Art The use of lighted signs is known in the prior art. More specifically, lighted signs heretofore devised and utilized are known to consist basically of familiar, expected and obvious structural configurations, notwithstanding the myriad of designs encompassed by the crowded prior art which have been developed for the fulfillment of countless objectives and requirements.

Known prior art lighted signs include U.S. Pat. No. 4,27,901; U.S. Pat. No. 4,848,017; U.S. Pat. No. 355,220; U.S. Pat. No. 356,423; U.S. Pat. No. 4,931,780 and U.S. Pat. No. 4,765,080.

While these devices fulfill their respective, particular objectives and requirements, the aforementioned patents do not disclose a new Illuminated Address Sign . The inventive device includes a light housing having at least one open face, a light source disposed in the light housing, a face plate mounted on the open face of the light housing, and at least one alphanumeric member being accepted by the face plate.

In these respects, the Illuminated Address Sign according to the present invention substantially departs from the conventional concepts and designs of the prior art, and in so doing provides an apparatus primarily developed for the purpose of displaying a street address on a building.

SUMMARY OF THE INVENTION

In view of the foregoing disadvantages inherent in the known types of lighted signs now present in the prior art, the present invention provides a new Illuminated Address Sign construction wherein the same can be utilized for displaying a street address on a building.

The general purpose of the present invention, which will be described subsequently in greater detail, is to provide a new Illuminated Address Sign apparatus and method which has many of the advantages of the lighted signs mentioned heretofore and many novel features that result in a new Illuminated Address Sign which is not anticipated, rendered obvious, suggested, or even implied by any of the prior art lighted signs, either alone or in any combination thereof.

To attain this, the present invention generally comprises a light housing having at least one open face, a light source disposed in the light housing, a face plate mounted on the open face of the light housing, and at least one alphanumeric member being accepted by the face plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Illuminated Address Sign apparatus and method which has many of the advantages of the lighted signs mentioned heretofore and many novel features that result in a new Illuminated Address Sign which is not anticipated, rendered obvious, suggested, or even implied by any of the prior art lighted signs, either alone or in any combination thereof.

It is another object of the present invention to provide a new Illuminated Address Sign which may be easily and efficiently manufactured and marketed.

It is a further object of the present invention to provide a new Illuminated Address Sign which is of a durable and reliable construction.

An even further object of the present invention is to provide a new Illuminated Address Sign which is susceptible of a low cost of manufacture with regard to both materials and labor, and which accordingly is then susceptible of low prices of sale to the consuming public, thereby making such Illuminated Address Sign economically available to the buying public.

Still yet another object of the present invention is to provide a new Illuminated Address Sign which provides in the apparatuses and methods of the prior art some of the advantages thereof, while simultaneously overcoming some of the disadvantages normally associated therewith.

Still another object of the present invention is to provide a new Illuminated Address Sign for displaying a street address on a building.

Yet another object of the present invention is to provide a new Illuminated Address Sign which includes a light housing having at least one open face, a light source disposed in the light housing, a face plate mounted on the open face of the light housing, and at least one alphanumeric member being accepted by the face plate.

Still yet another object of the present invention is to provide a new Illuminated Address Sign that allow people to easily read a building's address from at distance at night.

Even still another object of the present invention is to provide a new Illuminated Address Sign that is uncomplicated in use so that a person can easily change or replace the alphanumeric members as the need arises.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a sectional view of the present invention.

FIG. 4 is a cross sectional view taken along line 4—4 of FIG. 3.

FIG. 5 is an exploded isometric view of the present invention showing the insertion of a alphanumeric member into a light hole.

FIG. 6 is a cross sectional view taken along line 6—6 of FIG. 5.

DESCRIPTION OF THE PREFERRED EMBODIMENT

Figure 1:
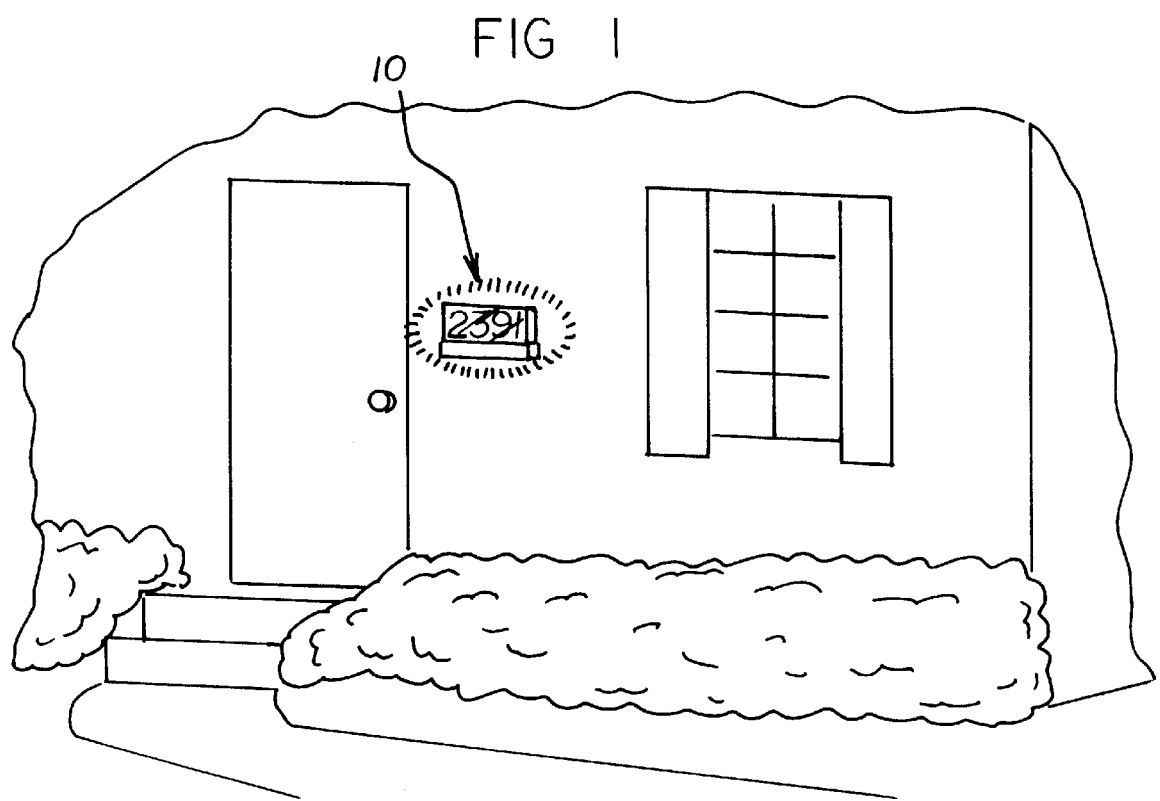
FIG. 1 is a perspective view of a new Illuminated Address Sign on a building of according to the present invention.
Figure 2:
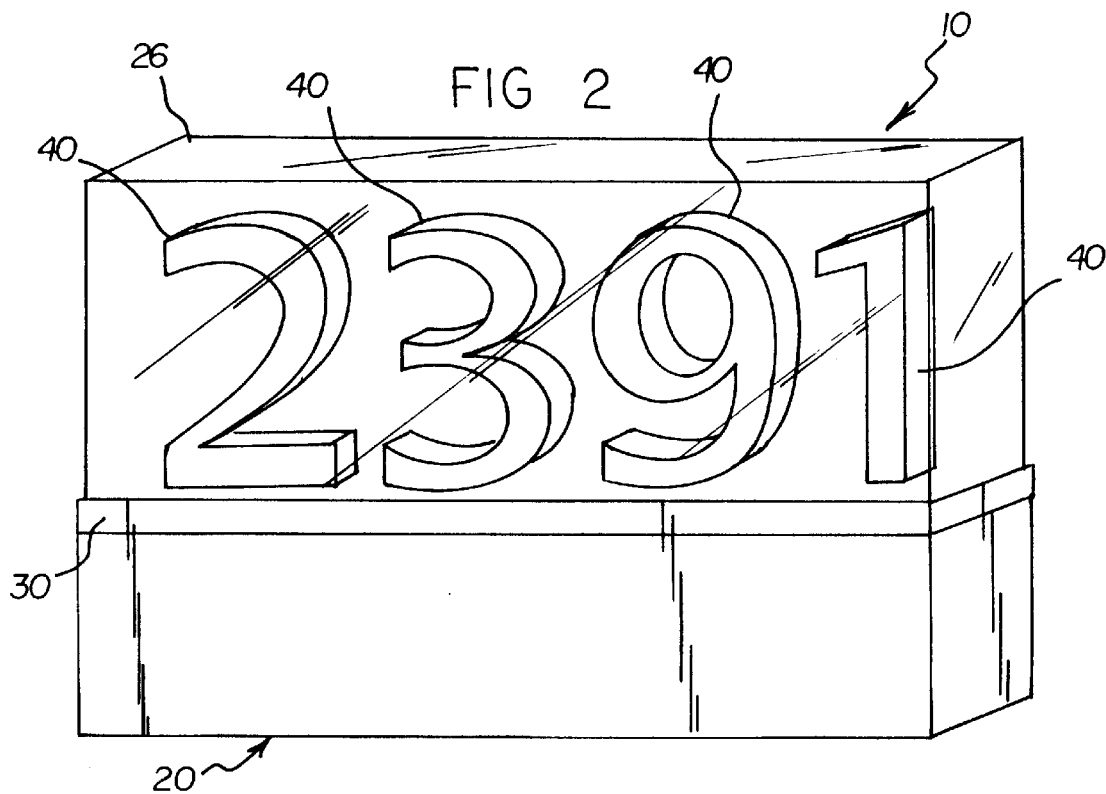
FIG. 2 is a perspective view of the invention.

With reference now to the drawings, and in particular to FIGS. 1 through 6 thereof, a new Illuminated Address Sign embodying the principles and concepts of the present invention and generally designated by the reference numeral 10 will be described.

More specifically, it will be noted that the Illuminated Address Sign 10 comprises a light housing 20, a face plate 30, a light source 50, and at least one alphanumeric member 40.

As best illustrated in FIGS. 1 through 6, it can be shown that the light housing 20 is generally box shaped forming an inner light chamber 20 into which a light source 50 is placed. The light housing 20 has an open face 24, preferably its top face. The light housing 20 can be made of various materials such as metal, wood or plastic and should generally be opaque. The face plate 30 is mounted on to the open face 24 of the light housing 20 to cover the inner light chamber 22 with its inner side 34. The face plate 30 has a series of light holes 36 that extend through the face plate's outer side 32 to its inner side 34. The face plate 30 can be made of various materials such as plastic, glass, wood or metal and can be opaque, translucent, or transparent in nature.

The alphanumeric members 40 include a light stud 42 at its base. The light studs 42 of alphanumeric members 40 are inserted into the light holes 36 of the face plate 30. This allows for light to shine through from the light source 50 into the alphanumeric member 40 from its light stud 42 illuminating the alphanumeric member 40. The alphanumeric members 40 can be made of plastic or glass and should be translucent in nature. Ideally, the alphanumeric members 40 should be six inches in height, four inches in width and one inch in thickness. The alphanumeric members 40 can also be colored to shine light in a variety of colors. Ideally, any material used to form the alpha numeric members 40 should have weather resistant properties to allow the Illuminated Address Sign 10 to be displayed outdoors. For added protection from the elements, a transparent housing 26 defining an alphanumeric chamber 28 can be placed over the alphanumeric members 40 and be mounted either to the face plate 30 or the light housing 20. The transparent housing 26 can be made of plastic or glass.

The light source 50 generally comprises a light bulb 52 electrically coupled to a power source 54. The power source 54 can either be electricity from electric connections from the building or from an internal battery. A photoelectric power source 56, such as a solar cell, mounted to the light housing 56 and electrically coupled to the light source 50 can also be used to provide electrical power. The light source 50 could also feature an intermittent switch to allow for the Illuminated Address Sign 10 to have flashing light. The light source could also be wired to a doorbell in such a way to enable the light source 50 to provide light to the Illuminated Address Sign 10 when the doorbell is activated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An illuminated address sign comprising:

a light housing defining an inner light chamber, said light housing further having at least one open face;

a light source disposed in said inner light chamber of said light housing;

a face plate having a thickness, said face plate further having a substantially planar inner side and a substantially planar outer side, said inner side being mounted on said open face of said light housing, said face plate having at least one light hole passing through said face plate to provide an opening into said inner light chamber, and at least one alphanumeric member having a mounting portion, said mounting portion of said alphanumeric member having a length, said mounting portion of each alphanumeric member being received by said light hole through said face plate to thereby permit light from said light source in said light chamber to be transmitted through said alphanumeric member, said mounting portion length being at least as long as said thickness of said face plate, said mounting portion length being for helping support said alphanumeric member in an upright position on said face plate;

wherein said face plate light hole is cylindrical and has a light hole diameter, and wherein said alphanumeric member further includes an alphanumeric portion being shaped like an alphanumeric character, wherein said alphanumeric member mounting portion is cylindrical and has a diameter, said mounting portion being rotatable within said light hole in a plane parallel to said face plate outer side to permit selective orientating of said alphanumeric portion in relation to the sides of said face plate.

2. The illuminated address sign of claim 1, additionally comprising a transparent housing defining an alphanumeric member chamber, and wherein said alphanumeric member is additionally disposed in said alphanumeric chamber.

3. The illuminated address sign of claim 2, wherein said transparent housing is removably mounted on said face plate.

4. The illuminiated address sign of claim 2, wherein said transparent housing is mounted on said light housing.

5. The illuminated address sign of claim 10, wherein said alphanumeric member is composed of a translucent material.

6. The illuminated address sign of claim 1, additionally comprising a photoelectric power source mounted to said light housing and electrically coupled to said light source for supplying power to said light source.

7. The illuminated address sign of claim 1, wherein said mounting portion of said alphanumeric member comprises a light stud and said light stud is inserted in said light hole of said face plate.

8. The illuminated address sign of claim 7, wherein said light source comprises at least one bulb electrically connectable to a power source, said bulb being positioned proximate said light hole.

9. An illuminated address sign, comprising:

a light housing defining an inner light chamber and having at least one open face:

a light source disposed in said inner light chamber of said light housing:

a face plate having a thickness, a substantially planar inner side and a substantially planar outer side, said inner face being mounted on said open face of said light housing, said face plate having at least one light hole therethrough to provide an opening into said inner light chamber:

at least one alphanumeric member having a mounting portion thereon, said mounting portion of said alphanumeric member having a length, said mounting portion of each alphanumeric member being received by said light hole through said face plate to thereby permit light from said light source in said light chamber to be transmitted through said alphanumeric member, said mounting portion length being at least as long as said thickness of said face plate, said mounting portion length being for helping support said alphanumeric member in an upright position on said face plate:

wherein said face plate light hole is cylindrical and has a light hole diameter, and wherein said alphanumeric member further includes an alphanumeric portion being shaped like an alphanumeric character, wherein said alphanumeric member mounting portion is cylindrical and has a diameter, said mounting portion being rotatable within said light hole in a plane parallel to said face plate outer side to permit selective orientating of said alphanumeric portion in relation to the sides of said face plate; and wherein said thickness of said face plate being greater than said light hole diameter for helping provide upright support to a said alphanumeric member mounted to said face plate.

10. An illuminated addresss sign comprising:

a light housing defining an inner light chamber and having at least one open face;

a light source disposed in said inner light chamber of said light housing, said light source being adapted for including at least one bulb electrically coupled to a power source;

a face plate having a thickness, said face plate having a substantially planar inner side, said face plate further having a substantially planar outer side, said inner side being mounted on said open face of said light housing, said face plate having at least one cylindrical light hole, said light hole passing through said face plate to provide an opening into said inner light chamber, said light hole having a light hole diameter, said thickness of said face plate being greater than said light hole diameter;

at least one alphanumeric member having an alphanumeric portion and a cylindrical mounting portion extending from said alphanumeric member, said alphanumeric member comprising a translucent material, said alphanumeric portion being shaped like an alphanumeric character, said mounting portion of said alphanumeric member having a length and a diameter, said mounting portion of each alphanumeric member being received by said light hole through said face plate to thereby permit light from said light source in said light chamber to be transmitted through said alphanumeric member, said mounting portion length being at least as long as said thickness of said face plate, said mounting portion length being for helping support said alphanumeric member in an upright position on said face plate, said mounting portion being rotatable within said light hole in a plane parallel to said face plate outer side;

a transparent housing defining an alphanumeric member chamber, said transparent housing being removably mounted on said face plate, said alphanumeric member being disposed within said alphanumeric chamber; and an auxiliary photoelectric power source mounted to said light housing and electrically coupled to said light source for supplying power to said light source.

\* \* \* \* \*